A. C. SANDVIG.
PITCHFORK.
APPLICATION FILED SEPT. 6, 1912. RENEWED FEB. 3, 1914.
1,109,251. Patented Sept. 1, 1914.
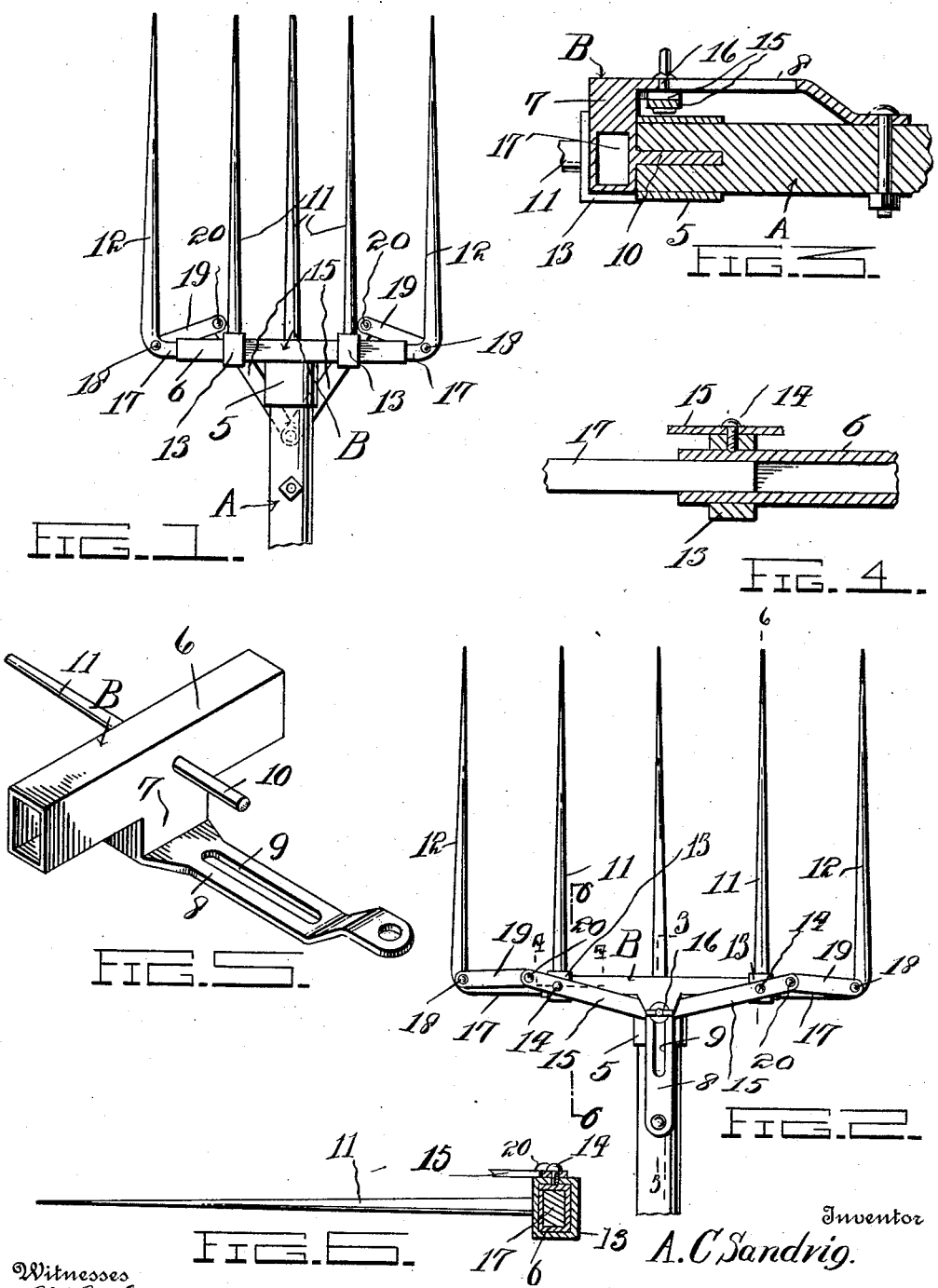

UNITED STATES PATENT OFFICE.

ALVIN C. SANDVIG, OF GRAFTON, NORTH DAKOTA.

PITCHFORK.

1,109,251. Specification of Letters Patent. Patented Sept. 1, 1914.

Application filed September 6, 1912, Serial No. 719,025. Renewed February 3, 1914. Serial No. 816,356.

*To all whom it may concern:*

Be it known that I, ALVIN C. SANDVIG, a citizen of the United States, residing at Grafton, in the county of Walsh, State of North Dakota, have invented certain new and useful Improvements in Pitchforks; and I do hereby declare the following to be a full, clear, and exact description of the invention, such as will enable others skilled in the art to which it appertains to make and use the same.

This invention relates to improvements in pitch forks.

The principal object of the invention is to provide a novel means for adjustably connecting the tines of the fork whereby the width of said fork may be readily regulated.

Another object of the invention is to provide a pitch fork of the character described which may be readily attached to any handle now in general use.

A further object of the invention is to provide a pitch fork of the character described which is composed of a minimum number of parts, is therefore simple in construction, and is cheap to manufacture.

With these and other objects in view, the invention consists in the construction and novel combination of parts hereinafter fully described, illustrated in the accompanying drawing and pointed out in the claims hereto appended; it being understood that various changes in the form, proportion, size and minor details of construction within the scope of the claims may be resorted to without departing from the spirit or sacrificing any of the advantages of the invention.

In the drawing: Figure 1 is a top plan view of a pitch fork constructed in accordance with my invention, the tines being shown in their normal positions, Fig. 2 is a bottom plan view thereof, the tines being shown in their extended relation, Fig. 3 is a detail sectional view taken on the line 3—3 of Fig. 2, Fig. 4 is a detail sectional view taken on the line 4—4 of Fig. 2, Fig. 5 is a perspective view of the head, and Fig. 6 is a detail cross sectional view taken on the line 6—6 of Fig. 2, the tines being shown in elevation.

Like reference numerals designate corresponding parts in all the figures of the drawing.

Referring to the drawing, A designates a handle which is provided with a ferrule 5 at one end. Attached to this end of the handle is a head B. The head B comprises a rectangular tube 6 which is formed with a central depending portion 7 from which rearwardly extends an attaching plate 8, said plate being formed with a longitudinal slot 9. This plate is secured at its free end to the handle A in spaced relation to the ferrule 5. Centrally projecting from the tube 6 above the attaching plate 8 is a pin 10 which projects into the ferrule end of the handle A, and serves to properly support the head.

My invention further comprises a plurality of intermediate tines 11 and end tines 12—12. The intermediate tines 11 are each formed at their inner ends with rectangular sleeves 13 adapted to slide upon the tube 6. Projecting downwardly from the underface of each sleeve 13 is a pin 14, and fulcrumed upon each pin is a lever 15, the inner ends of the levers being arranged in overlapping relation and disposed intermediate the handle A and the attaching plate 8. A tightening bolt 16 passes through the slot 9 of the attaching plate 8 and engages in suitable openings respectively formed in the overlapping ends of the levers 15, and is adapted to hold said levers in any adjusted position along the slot 9. The outer tines 12 are each formed with laterally extending angular arms 17, and these arms are arranged to telescope within the respective ends of the tube 6. Projecting downwardly from the angle of each tine is a pivot pin 18. Links 19—19 are each pivotally connected at one end to a pin 18, and at its other end to the free end of the lever 15, as at 20.

From the foregoing, it will be observed that when the inner ends of the levers 15 are secured to the outer end of the slot 9, the tines 12 will be disposed in their normal or contracted position. When, however, the inner ends of the levers 15 are disposed within the inner end of the slot 9, the outer tines 12 will be shifted outwardly along the tube 6 by means of links 19, as will be readily understood. It will of course be understood that when the tines 12 are moved in either position, the intermediate tines 11 will likewise be moved for a certain distance.

It will thus be observed that the width of the fork may be readily changed to suit various needs thereof.

What is claimed is:

1. In a pitch fork, the combination with a head, of outer tines connected to the ends of the head for adjustment therealong, intermediate tines slidable on the head, levers each fulcrumed intermediate its ends to a respective intermediate tine, links each pivotally connected at one end to the outer end of a lever and at its other end to a respective outer tine, and means for adjustably connecting the inner ends of the levers to the head.

2. In a pitch fork, the combination with a head having an attaching plate centrally extending therefrom and arranged at right angles thereto, of outer tines connected to the ends of the head for adjustment therealong, intermediate tines slidable on the head on either side of the plate, levers each fulcrumed intermediate its ends to a respective intermediate tine, links each pivotally connected at one end to the outer end of a lever and at its other end to a respective outer tine, and means for adjustably connecting the inner ends of the levers to the attaching plate.

3. In a pitch fork, the combination with a head having an attaching plate centrally extending therefrom and arranged at right angles thereto, of outer tines connected to the ends of the head for adjustment therealong, intermediate tines slidable on the head on either side of the plate, levers each fulcrumed intermediate its ends to a respective intermediate tine, links each pivotally connected at one end to the outer end of a lever and at its other end to a respective outer tine, and a pin and slot connection between the inner ends of the levers and the head.

4. In a pitch fork, the combination with a tubular head of angular cross section, of outer tines each having laterally extending angular arms telescopically arranged within a respective end of the head, intermediate tines respectively formed at one end with a rectangular sleeve for sliding engagement with the head, levers each fulcrumed intermediate its ends to a respective intermediate tine, links each pivotally connected at one end to the outer end of a lever and at its other end to a respective outer tine, and means for adjustably connecting the inner ends of the levers to the head.

5. In a pitch fork, the combination with a tubular head of angular cross section, a centrally disposed attaching plate extending at right angles from the head and formed with a longitudinal slot, of outer tines each having laterally extending angular arms telescopically arranged within a respective end of the head, intermediate tines respectively formed at one end with a rectangular sleeve for sliding engagement with the head, levers each fulcrumed intermediate its ends to the sleeve of a respective intermediate tine, links each pivotally connected at one end to the outer end of a lever and at its other end to the angle of a respective outer tine, and a clamping means extending through the slot of the plate and engageable with the inner ends of the levers for adjustably connecting the inner ends of said levers along the plate.

In testimony whereof, I affix my signature, in presence of two witnesses.

ALVIN C. SANDVIG.

Witnesses:
   CARL P. SANDVIG,
   NAFORD SANDVIG.

---

Copies of this patent may be obtained for five cents each, by addressing the "Commissioner of Patents, Washington, D. C."